(12) United States Patent
Rybnicek et al.

(10) Patent No.: US 6,831,380 B2
(45) Date of Patent: Dec. 14, 2004

(54) LOW INERTIA LATCHING MICROACTUATOR

(75) Inventors: Tara Jean Rybnicek, Santa Barbara, CA (US); John Wesley Stocker, Santa Barbara, CA (US); Jeffery Frank Summers, Santa Barbara, CA (US); John Stuart Foster, Santa Barbara, CA (US); Richard Thomas Martin, Goleta, CA (US); Paul John Rubel, Santa Barbara, CA (US); Patrick Edward Feierabend, Santa Barbara, CA (US)

(73) Assignee: Innovative Micro Technology, Goleta, CA (US)

( * ) Notice: Subject to any disclaimer, the term of this patent is extended or adjusted under 35 U.S.C. 154(b) by 0 days.

(21) Appl. No.: 09/764,919

(22) Filed: Jan. 17, 2001

(65) Prior Publication Data

US 2003/0117027 A1 Jun. 26, 2003

(51) Int. Cl.$^7$ .............................. H02K 33/16; H01F 7/14
(52) U.S. Cl. ............. 310/40 MM; 310/36; 310/DIG. 6; 335/229
(58) Field of Search ...................... 310/40 MM, 36–38, 310/12, 15, DIG. 6; 396/464; 360/264.7, 264.8, 264.9; 335/220, 222, 229, 270

(56) References Cited

U.S. PATENT DOCUMENTS

| | | | | |
|---|---|---|---|---|
| 4,992,685 A | * | 2/1991 | Boon et al. | ..................... 310/37 |
| 5,600,190 A | * | 2/1997 | Zettler | .................. 310/40 MM |
| 5,909,069 A | * | 6/1999 | Allen et al. | ........... 310/40 MM |
| 6,033,131 A | * | 3/2000 | Ghosh et al. | ................ 396/452 |

FOREIGN PATENT DOCUMENTS

| | | | | |
|---|---|---|---|---|
| JP | 2-60453 | * | 2/1990 | .......... H02K/33/18 |

\* cited by examiner

*Primary Examiner*—Burton Mullins (57) ABSTRACT

A surface micromachined micromagnetic actuator is described, wherein rotary actuation is accomplished by a member pivotably mounted on the surface of the substrate. Angular motion of the member about the pivot point is imparted by the interaction of a magnetic tab affixed to the member, with flux generated in the gap of an electromagnetic core. Rotary motion is restricted to less than 360 degrees by using an integrally formed hinge between the pivoting member and the pivot point, rather than by a more complex bearing. By virtue of this design, a large range of motion can be achieved without requiring a true bearing to be fabricated in the device. The pivoting member is also constrained in either of two stable positions upon de-energization of the electromagnetic core, by the attachment of a bistable spring between the pivoting member and the substrate.

24 Claims, 5 Drawing Sheets

LOW INERTIA LATCHING MICROACTUATOR

CROSS REFERENCE TO RELATED APPLICATIONS

This US patent application is being concurrently with U.S. patent application Ser. No. 09/765,522, entitled OPTICAL CROSS-CONNECT SWITCH WITH MICRO-ELECTRO-MECHANICAL ACTUATOR CELLS, by Hichwa, et al., (Attorney docket no. OC0101US); and patent application Ser. No. 10/866,123, entitled METHOD AND APPARATUS FOR ASSEMBLING AN ARRAY OF MICRO-DEVICES, by Feierabend, et al.; and U.S. patent application Ser. No. 09/765,520, entitled OPTICAL SWITCH WITH LOW-INERTIA MICROMIRROR, by Hichwa, et al. (Attorney docket no. OC0100US), the disclosures of which are hereby incorporated in their entirety for all purposes.

GOVERNMENT RIGHTS IN THE INVENTION

Not applicable.

FIELD OF THE INVENTION

This invention relates to micro electro-mechanical systems (MEMS). More particularly, this invention pertains to low inertia microactuators used to operate a switch, valve, piston, or other mechanism at high rates.

BACKGROUND OF THE INVENTION

High speed, high precision actuation devices are becoming required for a proliferating number of applications, in diverse fields. In industrial applications, very precise put-and-place actuators are required in printed circuit fabrication processes. Scientific applications may require sensors with very precise resolution, which implies fine motions. Deep space astronomical observations may use multifaceted mirrors, each facet independently controlled by a precision actuator. Digital projection cameras manipulate a plurality of reflectors, in order to cast an image onto a projection screen. Drug delivery systems in medical therapeutic treatment may require valves or pistons of high accuracy. Fault detection in vehicular safety systems require devices with precise, high speed motion. Computer disk drives require the alignment of the data heads over the sub-micron data track to a sub 0.1 um accuracy. In each case, the actuator drives the member of interest to a precise position or at a precise rate.

In general, the device itself (e.g. plunger, shutter, piston) may be of arbitrarily small size and low inertia. However, the driving member, i.e. the actuator, is not. The actuator must provide the force, throw (or range), and bandwidth to accommodate the application. Particularly in the case of high speed devices, stringent design criteria are set on the physical and mechanical properties that the actuator must possess. It should have low inertia and low power requirements. For low cost applications, it should also be mechanically simple. These considerations have led to the miniaturization of familiar electromechanical devices, using photolithographic processing rather than machining bulk components. Formation of sub-millimeter scale electromechanical systems is now well known in the art, as Micro Electromechanical Systems, or MEMS.

Among the simplest MEMS actuators that can be fabricated is the cantilevered beam, a device wherein a beam of substrate material is formed by patterning the dimensions of the beam and etching a void beneath it. This technique is described in examples "Microfabrication of cantilevers using sacrificial templates," U.S. Pat. No. 6,016,693 by Viani, et al., and "High vertical aspect ratio thin film structures," U.S. Pat. No. 6,015,599 by Keller, et al.

The beam has a finite stiffness determined by its shape and mechanical properties, and can thereby be deflected by application of force. The amount of deflection through small angles varies linearly with the applied force, that is, the beam deflection can be characterized by a spring constant. In most cases, the force applied is electrostatic: The beam, suspended over the void and substrate, forms a parallel plate capacitor with the substrate being the opposing electrode. Actuation, or movement of the beam, results from the application of a differential charge, or voltage, between the beam the substrate.

The device to be actuated, for example a mirror, is then mounted upon the beam, and steered by the electrostatic force between the beam and the substrate.

Cantilevered actuators, while relatively simple in concept and construction, are also limited in performance. Deflection must be perpendicular to the plane of the substrate, as this plane defines the parallel plate capacitor. Additional beams, gears and bearings can translate this motion out-of-plane, as in Ho et al., in U.S. Pat. No. 5,629,918 (1997), "Electromagnetically actuated micromachined flap." In this invention a flap, which is the moving member of the actuator, is coupled by one or more beams to a substrate and thereby cantilevered out of the plan of the substrate. While conceptually this invention allows larger motions in out-of-plane directions, the need for multiple beams and pivots seriously complicates the design and fabrication of the device, and deleteriously affects tolerances and rigidity.

Another difficulty with cantilevered actuators is that precise motion and high bandwidths require relatively stiff cantilevers. But since deflection is linearly proportional to the spring constant, a stiffer beam requires more force to achieve a certain throw. The tradeoff between stiffness, throw and bandwidth relegates cantilevers to a narrow range of applications. They are suitable for small ranges of motion, or in situations where large supply voltages are available.

Electrostatic forces are also relatively weak and provide actuation over small ranges, compared with, for example, magnetostatic forces. For this reason, magnetostatic devices are often preferred over electrostatic devices. Micromachined solenoidal magnetic actuators are known in the art, as micro-solenoid switches. Typically, a slug of magnetic material is affixed to a piston or plunger, and a coil is provided whose diameter is sufficient to admit the slug into its interior. The coil is then energized to repel or attract the slug, depending on the direction of current in the coil. The resulting linear mechanical motion is used to actuate various linear devices, such as opening and closing a switch or valve, or driving a piston.

An embodiment of a linear, solenoidal microactuator is found for example, in Guckel, et al., U.S. Pat. No. 5,644,177 (1997), "Micromechanical magnetically actuated devices." The microactuator in this patent comprises a ferromagnetic mandrel around which a fine electrical wire conductor is wound, the mandrel further including pegs which locate and mate with corresponding receptacle holes in the stationary magnetic core.

Linear magnetic actuators are capable of higher forces and larger ranges of motion at lower driving voltages than cantilevered electrostatic actuators. They are therefore capable of actuating relatively large loads or operating against large spring constants. However, their throw is limited to the characteristic dimensions of the solenoid. Also, they operate against a spring force, required to return the moving member to the home position. This spring force requires more force or less throw, for a given energy density in the device. The spring also imparts a vibration to the device being actuated, and in general, the device is not functional until the vibration has ceased. This can add significant settling time to the switching speed.

A third design option is a rotary actuator. This device resembles a miniaturized electromagnetic motor, with a ferromagnetic material deposited on the substrate and wound with an electrical coil. Energizing of the coil induces magnetic flux in the permeable material. Generally the core is patterned with some arrangement of gaps, into each of which protrudes a driven member which interacts magnetostatically with the flux across the gap. A plurality of such elements, when driven in the proper sequence and timing, can produce a positive torque on a freely rotating member. A wide variety of designs for these magnetostatic micromotors can be found in the body of MEMS patents and publications, notably Garcia et al., U.S. Pat. No. 5,917,260 (1999) "Electromechanical millimotor;" "Surface Micromachined Microengine,"-E. J. Garcia, J. J. Sniegowski, *Sensors and Actuators*, A 48, pp. 203–214 (1995); and U.S. Pat. No. 5,631,514 "Microfabricated microengine for use as a mechanical drive and power source in the microdomain and fabrication process."

Notwithstanding the details of the various designs, the micromotors are conceptually similar to the familiar large scale rotor/stator electromagnetic motors.

Magnetostatic micromotors can be used as rotary actuators by mounting the device of interest onto the moving member, i.e. the rotor. This concept is clearly described in Mehregany, et al. in U.S. Pat. No. 6,029,337 (2000), "Methods of fabricating micromotors with utilitarian features." This patent describes a micromotor fabricated using the same general principles as found in the MEMS art, but with additional material deposited on the rotor, constituting the utilitarian feature, such as fins, pump impellers, or optical elements. Energizing the stator induces rotary motion of the rotor bearing which rotates the affixed element into the desired position.

Micromotors overcome some of the limitations of cantilevers and solenoids, by having a large range of motion. However the requirement of a stator and freely rotating bearing constitute a substantially more complex device to make via MEMS processing. Further difficulties arise with rotor/stator actuators. As is well known with macroscopic motors, the initial direction of rotation is ambiguous: it may be either clockwise or counterclockwise. In addition, the rotation direction cannot be determined until sufficient motion has allowed sensing of the rotation. A correlated difficulty is that there is no defined "home" position of the rotor when the device is not energized. Again direct measurement means must be provided to determine the degree of rotation from a specific home point.

Therefore, a low inertia, high bandwidth, large throw, low power microactuator is a distinctly felt need in a wide variety of applications. However the prior art suffers from a number of disadvantages, including the following:

a) Cantilevered devices must be energized to maintain a given position against the restoring force of the spring constant, and therefore require constant power;

b) Cantilevers have limited throw, as the deflection is linearly related to the spring constant;

c) Cantilevered devices are generally electrostatic, further limiting their practical operating range;

d) Cantilevered devices which use additional beams or pivots to amplify or translate motion, suffer a loss of precision, repeatability and uniformity across devices, as well as complication of design and fabrication;

e) Solenoidal or in-line linear devices have a range of motion limited to the characteristic dimension of the coil;

f) Solenoidal devices operate against a fixed spring, and therefore dissipate power as does a cantilevered device;

g) Rotary devices are complex to fabricate because of the plurality of driving structures and requirement of a freely rotating bearing;

h) Rotary devices have an ambiguous direction of motion;

i) Rotary devices have an undefined home or détente position.

j) Other known actuators provide for motion but not braking of that motion, leaving the device in vibration after actuation. This lengthens the total switching time, which includes actuation time plus sufficient settling time.

SUMMARY OF THE INVENTION

The present invention overcomes the limitations of the prior art for low inertia, high bandwidth actuators. The invention is a hybrid device, incorporating one or more features of each of the basic types of microactuators: cantilevered, solenoidal, and rotary. The actuator comprises a magnetic core with a gap affixed to the substrate, and wound with an electrical coil, as in a micromotor. Energizing of the coil induces a magnetic flux through the core material and across the gap in the core. However the driven member is not a piston, plunger, or rotor, but rather a hinge-mounted member, which pivots about a stationary point. The driven member includes a tab of magnetic material, which interacts with the core gap field, to impel motion of the member about the pivot point.

The pivoting motion is enabled by a flexible hinge structure, which connects the driven member to the stationary pivot point. Use of a hinge rather than a true bearing, results in a cantilever-like device with a range of motion substantially less than 360 degrees. This range is ample for most applications, which require simply an "on" and "off" position. Avoidance of a bearing structure significantly simplifies the design and fabrication of the device. The limited range of motion allows for the use of a single toroidal driving structure rather than a plurality of synchronized drivers as in a true rotary actuator.

Another feature is the inclusion of a détente latching spring system, with two or more stable positions, such that the pivoting member may be latched in any one of the stable positions upon power-down. It thereby avoids the difficulties encountered with true rotor/stator micromotors, wherein no unique home position can generally be defined.

Lastly, the invention includes an auxiliary magnetic circuit for unambiguously sensing the orientation of the pivoting member. The sensing circuit can distinguish between the plurality of stable positions, and can be equipped with a feedback loop to fine tune the driving circuit for optimum performance. The sensing apparatus and feedback loop make possible braking action, or even full servo control, to minimize vibration and settling time of the pivoting member.

As a result of its novel design, this invention achieves the following objects and advantages over the prior art:

a) To provide low inertia, high bandwidth actuation;

b) To provide a large range of motion in the actuation;

c) To provide an actuator with an unambiguous direction of motion;

d) To provide an actuator whose position can be determined by a simple, on-board measurement circuit; and e) To provide a low loss actuator, which can maintain one of a plurality of stable positions in the quiescent (unenergized) state.

f) To improve switching times by applying a braking force or full servo control of the pivoting motion.

A further object of this invention is to use variations of known micromotor fabrication techniques, in order to avoid further process invention.

A further object of the invention is to achieve the design using, where possible, known MEMS microcomponents, subassemblies, and electronic circuitry.

Still a further object of the invention is a design sufficiently simple, that it can be practiced in various thin-film fabrication facilities, which use slightly different tools and procedures, to achieve a reproducible, uniform and predictable product, without undue experimentation or adaptation of the equipment.

Still further objects and advantages will become apparent to those of ordinary skill in the art upon examination of the following detailed description of the invention or can be learned by practice of the present invention. It should be understood, however, that the detailed description and the specific examples being presented, while indicating certain embodiments of the invention, are provided for illustration purposes only. Various changes and modifications within the scope and spirit of the invention will become apparent to those of ordinary skill in the art from the detailed description of the invention and the claims that follow.

BRIEF DESCRIPTION OF THE DRAWINGS

In the drawings, closely related figures have the same number but different alphabetic suffixes.

FIG. 7b shows the velocity profile of the driven member, as a result of the current profile of FIG. 7a.

REFERENCE IS IN THE DRAWINGS 20 true pivot point
30 pivot bearing attachment post
40 hinge
50 rigid load beam
60 pivoting member
80 area for mounting utilitarian feature
100 radial spring
120 spring anchor point
130 spring attachment post
140 clam shell pivot bearing
160 magnetic protruding tab
190 pinch
200 actuator pole
210 sensing pole
220 adjacent actuator pole
230 adjacent sensing pole
240 input coil
250 intermediate coil
260 output coil
270 intermediate coil
280 magnetic bridge 1
290 magnetic bridge 2
300 magnetic bridge 3
320 superstrate
340 bonding pad 1
360 bonding pad 2
500 switch comparator
520 inductance comparator
540 frequency generator
560 resistor
580 capacitor
920 rigid link
940 c-spring
960 serpentine spring

DETAILED DESCRIPTION OF THE INVENTION

Figure 1:
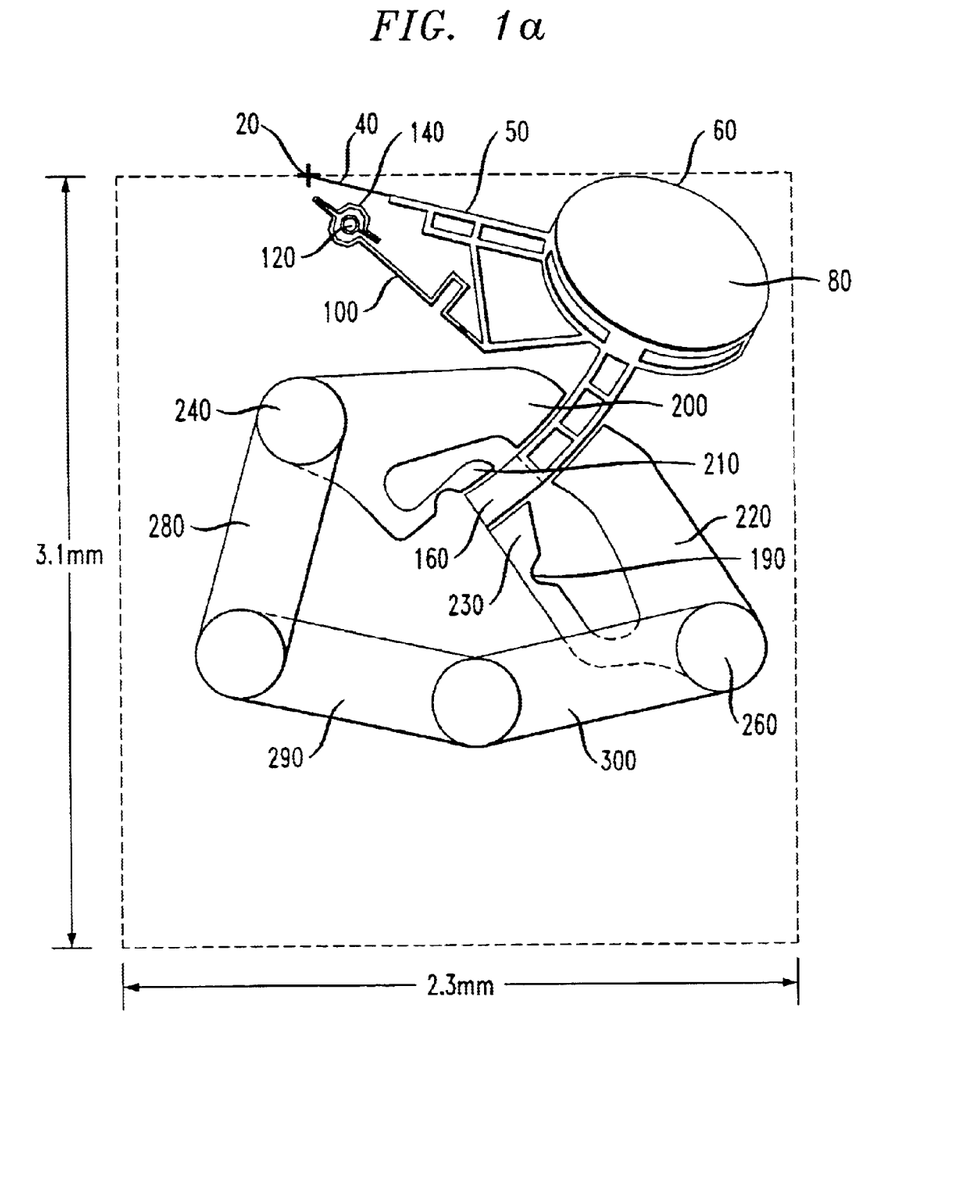
FIG. 1a is a simplified top-down view of the preferred embodiment, with the pivotably mounted member in the fully retracted position.
FIG. 1b is a simplified top-down view of the preferred embodiment with the pivotably mounted member in the fully extended position.

Actuator design: The design and functioning of the low inertia latching microactuator can be understood by consideration of FIGS. 1a and 1b. Referring first to FIG. 1a, the top-down view shows the major structures of the device: A pivoting member 60 which supports the device to be actuated; a pivot point 20 and attachment post 30, connecting the pivoting member to the pivot point 20; a second attachment point 120 with spring attachment post 130, connecting the pivoting member 60 to the superstrate 320 through radial spring 100; a magnetic tab 160 affixed to the pivoting member 60; a magnetic core with poles 200 and 220; current carrying coils 240 and 260; magnetic bridges 280, 290, and 300; a second magnetic core with poles 210 and 230.

The pivoting member 60 is attached to the substrate at a fixed pivot point 20, via attachment post 30. Member 60 is adjoined to the attachment post by a simple hinge 40, which is a narrow isthmus of material whose dimensions are such that the member can easily rotate approximately 30 degrees about the pivot point 20. The hinge is flexible to angular motion but rigid in out-of-plane motion and radial compression or tension. The hinge is connected to the true pivot point by a pivot bearing attachment post 30.

These structures are created on the top surface of the wafer, the superstrate 320, according to processes well known in the MEMS art. The substrate is a composite silicon-on-insulator (SOI), which is a commercially available thick sandwich of single crystal silicon substrate, 500 um thick, an insulating layer of $SiO_2$, 2 um thick, and another layer of single crystal Si, 40 um thick. The upper layer of thin Si is the superstrate, 320. The major mechanical features of the low inertia actuator are patterned in the superstrate by etching the silicon down to the $SiO_2$ layer. The features created are "released" by immersion in hydrofluoric acid, which etches away the $SiO_2$, but leaves the single crystal Si substrate and superstrate intact., as well as the portion of the $SiO_2$ layer forming the attachment posts 30 and 130.

The pivoting member further comprises a protruding tab 160, which is either made of magnetic material or has magnetic material deposited on it. This feature, henceforth referred to as the magnetic tab 160, may be made of ferromagnetic material or permanent magnetic material. In the preferred embodiment, a ferromagnetic nickel-iron alloy is chosen, with 45% nickel and 55% iron. This stoichiometry is known in the industry as permalloy.

The rotating member further comprises an area 80, which carries the device of interest to be actuated, such as a piston, switch, or optical element.

A patterned core of magnetizable material is also deposited on the substrate surface, along with a set of energizing coils 240 and 260. The material selected for the core is again nickel-iron permalloy, chosen for its outstanding permeability, and because its deposition processes are well known from application in magnetic recording heads and micromotors. All magnetic features in the preferred embodiment are made by deposition of this alloy, although it will be clear to those skilled in the art that any suitably permeable material can be used, such as other stoichiometries of nickel-iron.

The coils are of an electrically conductive material, chosen in the preferred embodiment to be plated copper. It is understood by those skilled in the art that there are a variety of methods to generate the conductive windings, including the "pancake" style windings shown in FIGS. 1*a* and 1*b*, which are commonly used in the recording head industry. Additional methods include toroidal windings made using thin-film techniques and windings of insulated wire made by hand or machine.

A gap, wide enough to admit the magnetic tab 160, is patterned in the core and creates a pair of magnetic poles 200 and 220. Flux existing in the core will travel to the poles and across the gap. The flux circuit is completed by the magnetic bridges 280, 290 and 300. If the slug moves in a path centered between the poles, then there is no net lateral force. If you offset the position of the slug toward one pole, then there is a lateral force that pulls the slug toward the "thinner gap" pole and away from the "thicker gap". If the beams are not made sufficiently stiff; the slug can be drawn into contact with the nearer pole. An embodiment which guards against this occurrence is the "asymmetric gap", in which the slug and armature are offset towards the outer core magnet. This offset deflects the hinge spring, which then exerts a restoring torque on the slug and armature. This is a stable configuration, since the hinge is quite stiff in this dimension.

An additional gap and set of poles 210 and 230 is patterned in the core. This magnetic circuit will be used for sensing the orientation of the rotating member, and permit fine adjustment of the actuation forces. The functioning of the sensing poles will be described further below.

Flux is induced in the core by energizing the coils 240 and 260. The flux circulates through the core, to the poles and across the gap. The interaction of the gap field with the magnetic tab causes an attractive torque on the pivoting member. The torque draws the magnetic tab toward the centered position between the poles. The inertia of the rotating mass carries it through the centered position toward another stable position derived from the latching spring system.

The pivoting member is rigid to radial compression by attachment to the true pivot point 20 through the rigid load beam 50. A hinge 40 connects the load beam to the pivot point. The hinge, a narrowed isthmus of the substrate material, allows flexion in the angular direction about the true pivot point. The hinge, rigid load beam, and pivoting member with area 80, are monolithic, that is they are all composed of single crystal silicon by selective removal of the surrounding substrate material.

A distinguishing feature of this invention is the inclusion of a latching spring system, which restrains the pivoting member 60 in one of a plurality of stable positions. The member is driven between the positions, as described above, by the interaction of the gap field with the magnetic tab 160 affixed to the pivoting member. The spring may also be monolithic, that is, formed simultaneously with the pivoting members and its associated mechanisms. Examples of such systems are an "S" spring with and inflection point, or a set of springs suitably disposed so as their spring constants work in concert and in opposition to create multiple stable states.

In the preferred embodiment described here, the latching system is formed by having two different attachment points for the pivoting member. The attachment points are the true pivot point 20 and the spring anchor point 120. The pivoting member is adjoined to anchor point 120 by a radial compression spring 100, shown in greater detail in FIG. 2. The spring anchor point 120 is not collocated with the true pivot point 20, and has a different radius of curvature. The radial spring further comprises the following structures: a "clamshell" pivot bearing 140, a stiff load beam 920, a "c"-spring 940, and a serpentine spring 960. The function of these features will be described in detail.

Figure 3A:
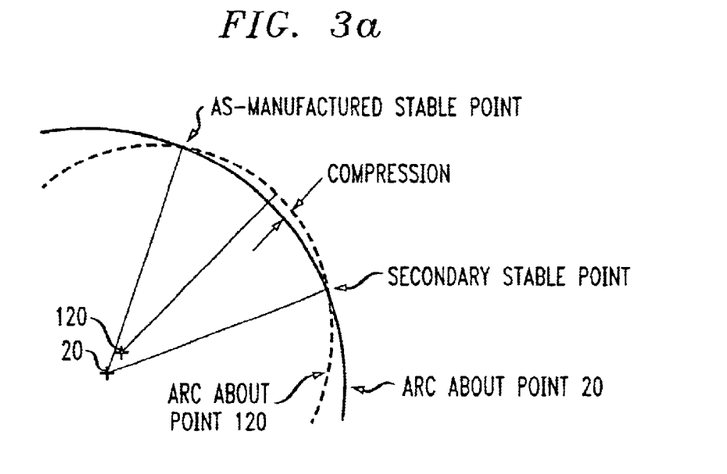
FIG. 3a shows the arcs of travel of the driven member about the two points of rotation: the pivot point and the spring anchor. Two intersection points between the two arcs constitute stable positions for the driven member.

If the radial spring 100 and the rigid load beam 50 were uncoupled, their independent motions could be characterized by two arcs of rotation with different radii of curvature, as illustrated in FIG. 3*a*. As can be seen from the diagram, the arcs of rotation have two intersection points. These are the two stable positions, wherein the pivoting member can stably reside with no driving force from the magnetic core. It is noted that the true stability points are a result of balanced forces on all the movable members in the system, and that depending on the details of the design, the stability points will not be exactly coincident with the intersection of the two arcs shown. Nevertheless, this approximation is useful in describing and understanding the function of the device.

Figure 2:
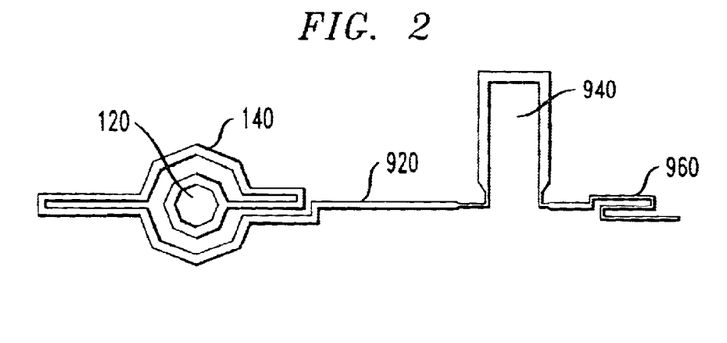
FIG. 2 is a simplified diagram of the latching spring, showing detail of the pivot bearing and spring body.

Since the true pivot point and the spring anchor point are not collocated, and the member is rigidly attached to the true pivot point, the angular trajectory about the true pivot must be accommodated by the radial spring. This is accomplished by the compliant c-spring portion 940 of radial spring structure 100. The c-spring is a rectangular kink in the beam connecting the pivoting member to the spring pivot. This kink can compress and rarify in response to the arc of travel of the pivoting member.

Figure 1B:
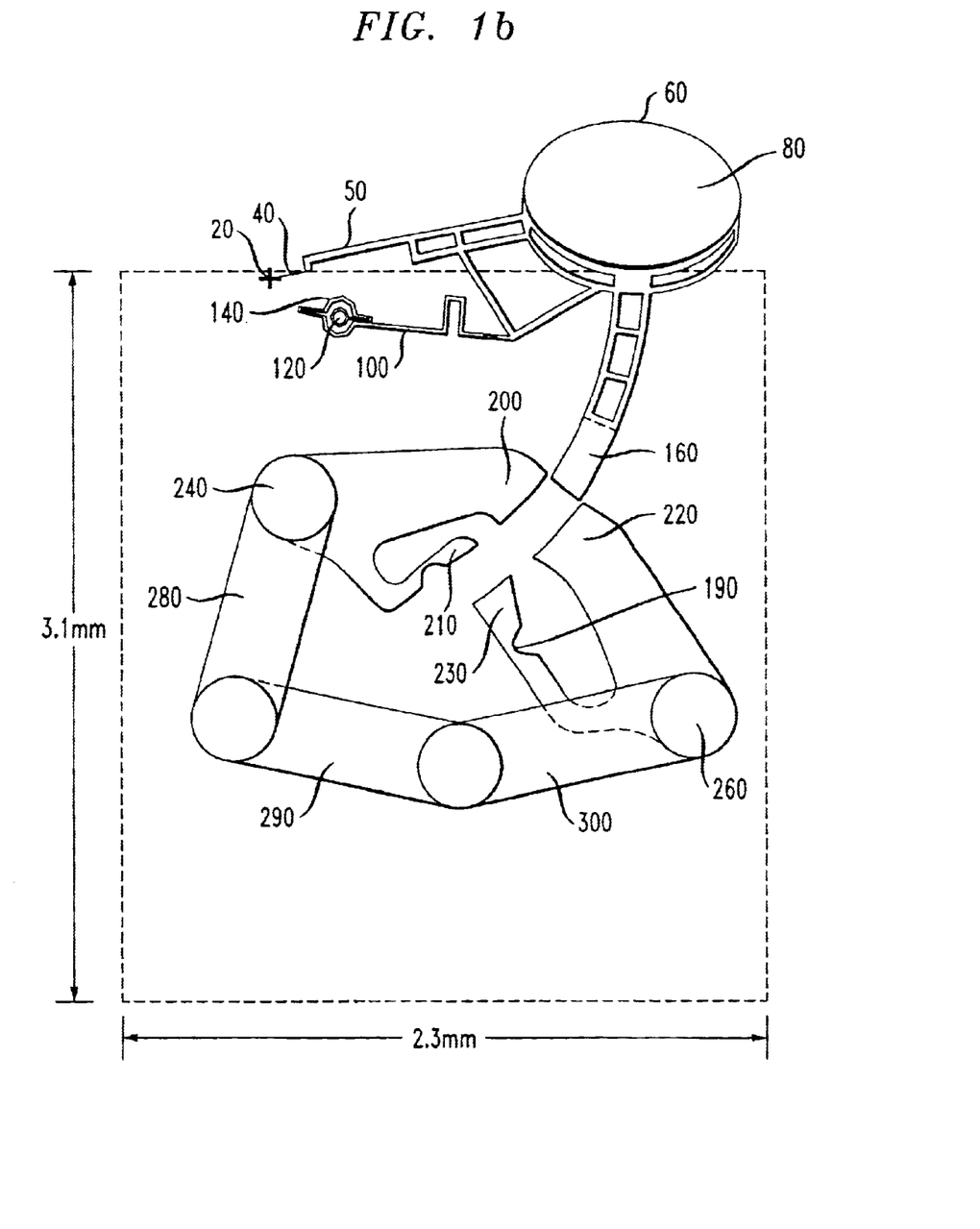
Figure 3B:
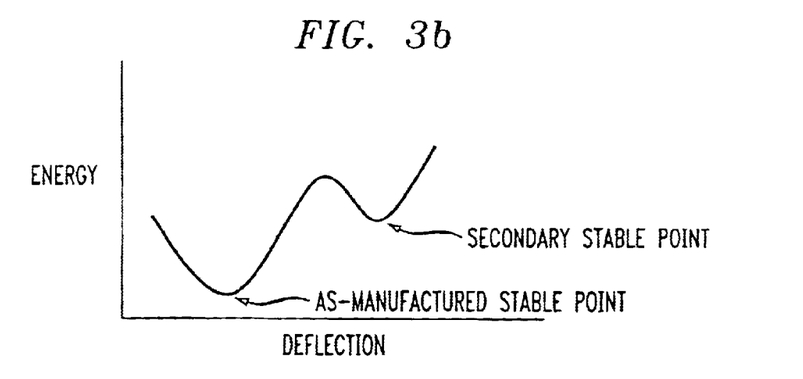
FIG. 3b is an energy level diagram, showing the local energy minima due to the latching spring.

The upper intersection of the arcs in FIG. 3*a* represents the as-manufactured state, wherein spring 100 has no compression and no strain from rotation. This situation corresponds to the fully retracted position shown in FIG. 1*a*. As rotating member 60 begins to move, spring 100 will rotate and compress at the c-spring 940, and the restoring force of the c-spring creates the energy barrier between the two stable positions. The energy level diagram is shown qualitatively in FIG. 3b. As rotating member 60 moves farther, the c-spring 940 goes through the maximum compression and eventually decompresses, which gives rise to the secondary minimum in the energy profile of FIG. 3b. These two stable positions correspond to the retracted orientation (FIG. 1a) and extended orientation (FIG. 1b).

The detailed dimensioning of the c-spring determines the stiffness and therefore the energy barrier between the stable positions. The amount of compressive force can be manipulated by design, for example by moving the position of spring anchor 120, or changing the aspect ratio or thicknesses of the c-spring 940. It will be clear to one skilled in the art that many variations of this embodiment can be envisioned without departing from the spirit and scope of this invention, depending on the throw, torques, voltages and other design aspects of a particular application.

The pivot/spring system forms the "latch", which latches the utilitarian feature in either of the two stable positions, either extended or retracted. Upon cessation of the driving current, the pivoting member will remain in the chosen stable position.

The spring is anchored to the substrate through a clamshell pivot bearing. This bearing allows angular motion about the anchor point, but avoids a continuously rotating bearing which is far more complex to fabricate and is subject to stiction and wear. The restoring force of the pivot bearing is small, such that through the arc of travel between the extended and retracted positions, the restoring force is dominated by the radial spring rather than the pivot bearing.

The beams of clam-shell pivot bearing 140 are arranged so that they wrap around spring anchor 120 and spring attachment post 130. The bearing was shown in detail in FIG. 2. As rotating member 60 is rotated, the beams above the anchor point bend in the opposite direction as the beams below the anchor point. This creates a circular rotation about the anchor point. Spring hinge 900 is very stiff to radial loads, due to the number of beams, their relatively small length, and the fact that the rotation of the mechanism is such that the majority of radial load on the hinge is in the direction to apply compressive or tensile load.

A further component of spring 100 shown in FIG. 2, is rigid link 920, which links clam-shell pivot bearing to the c-spring portion 940. Rigid link 920 is designed to stiffen the spring in the radial direction. Radial compression of the spring takes place predominantly in the c-portion, which is designed to be stiff in bending but compliant in radial compression.

Serpentine spring 960 is the final component of spring 100, connecting c-spring 940 to rotating member 60. Serpentine spring 960 has a torque applied to it by the changing of relative angles between rotating member 60 and spring 100. This torque is significant and can cause spring 100 to rotate in a non-circular fashion. Serpentine spring 960 reduces the rotational stiffness by distributing the stress over an effectively large beam length, and yet maintains a very high radial stiffness, which is desirable. Compared to a simple flexing beam hinge, serpentine hinge 960 reduces the rotational stiffness of the entire system and allows spring 100 to rotate about the attachment point to pivoting member 60.

Figure 4:
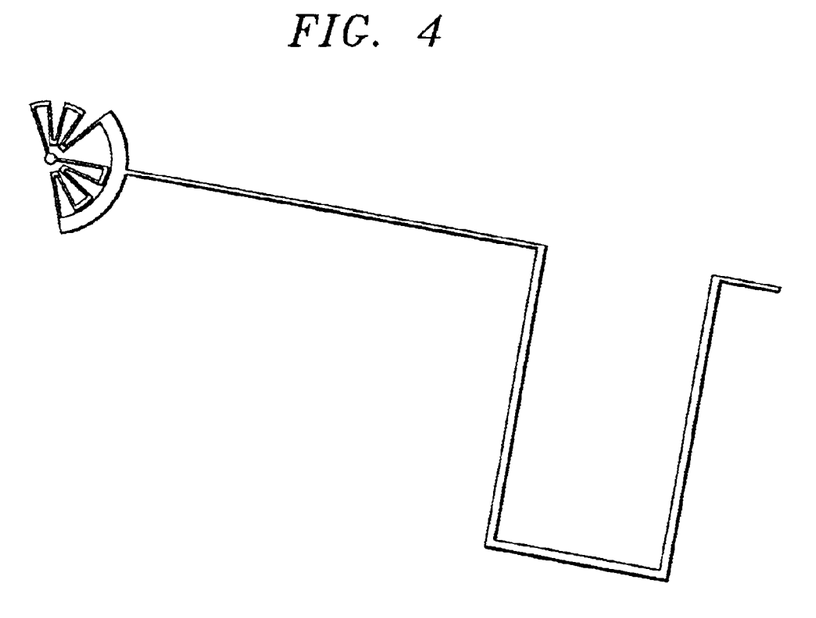
FIG. 4 is an alternative embodiment of the pivot bearing, using an accordion-shaped design.

Again, alternative embodiments for pivot bearings with high radial stiffness will be clear to one skilled in the art, based on this concept of a monolithic bearing which allows essentially free rotation through an arc of travel substantially less than 360 degrees. For example, FIG. 4 shows an accordion-shaped pivot bearing, which also satisfies design requirements of high angular compliance and high radial stiffness, but is more complex in design.

The full device includes supporting features such as bonding pads 340 and 360 for electrical connection to the coils from an external power supply. Various electronic support devices are also formed on the lower side of the substrate. Since these devices and their fabrication are well known in the semiconductor industry, they are not shown here. It would be clear for example, to one skilled in the art, that the electrical coils 240 and 260 are electrically connected to bonding pads 340 and 360. Any number of intermediate posts, such as posts 250 and 270, can be included to increase the number of current loops driving flux through the core. The posts bearing the current carrying coils are connected in series, that is the current enters (or exits) from bonding pad 340, onto post 240, which is connected in series to post 250 where the coil is wound again, to post 270 and 260, whereupon it exits the device via a bonding pad 360.

Figure 5:
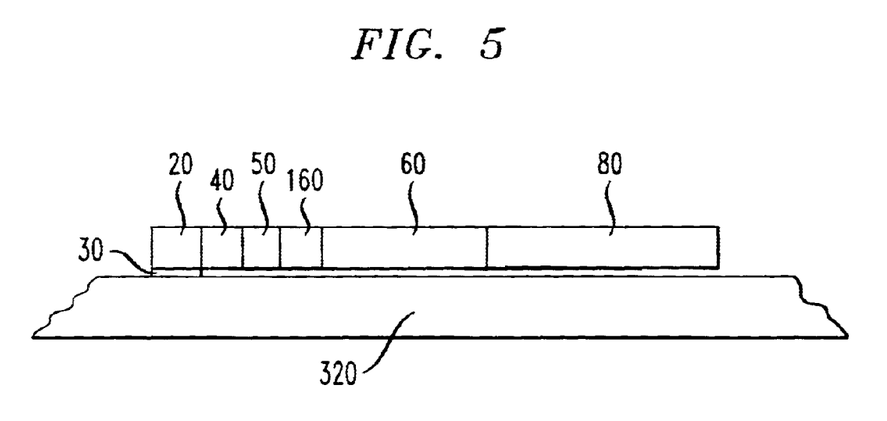
FIG. 5 is a cross-sectional view through the actuator device and supporting substrate.

FIG. 5 is a cross-sectional view through the fabrication plane of the device. The view shows the true pivot point 20, rigidly attached to the superstrate 320 by pivot attachment post 30. The pivoting member is otherwise aloft of the substrate and free to move. The void between the member and the substrate is formed by standard MEMS photolithographic procedures used to form moveable features by the elimination of material directly beneath the moveable member.

Sensing apparatus: The position of the magnetic tab, and therefore of the rotating member 60, can be determined by measuring the inductance of the magnetic actuating circuit comprising poles 200 and 220, and bridges 280, 290 and 300. However, a more precise measurement can be made by providing an independent, more sensitive magnetic circuit. Such a circuit is the preferred embodiment. It comprises a pair of auxiliary magnetic poles, 210 and 230, that are provided as a magnetic sensing circuit, which measures the position of the rotating member. When current is applied to coils 240 and 260, a magnetic flux path is established between sensor pole 210, across the narrow gap to the magnetic tab, across the adjacent narrow gap between the tab and to the adjacent sensor pole 230 to bridges 280, 290 and 300, and back to the major core structure to complete the magnetic circuit.

For convenience, the sensor pole material would generally be the same as that of the main poles, here being nickel-iron permalloy. It is noted however, that the sensor poles may be of a different material in order to optimize separately the magnetic properties and performance of the actuator magnetic circuit comprising poles 200 and 220, and sensing magnetic circuit, comprising poles 210 and 230.

Each sensing pole is carefully shaped with a narrowed portion as shown in FIG. 1a, designated the "pinch" region, shown as area 180 in FIGS. 1a and 1b. The function of the pinch is to limit the magnetic flux flowing through the sensor pole 210. The pinch region 180 becomes magnetically saturated, at which point the reluctance of the magnetic circuit rises. Saturation of the sensor pole assures that most of the flux is carried by the major actuator poles, in order to maximize the torque of the actuator during operation.

For the this embodiment, the width of the narrowed region is on the order of 10%–30% of the width of the sensor poles 210 and 230. In general the width of the pinch will depend on the accuracy needed for the measurement. A narrower pinch provides a more sensitive measurement, but with a smaller dynamic range.

The sensor poles also exert a force on the rotating member, and this additional force can be used to offset or fine-tune the behavior of the overall actuator. Tuning of this force is accomplished by adjusting the width of the pinch region 180.

Measurement of the position of the magnetic tab 160, and therefore the orientation of the rotating member 60, is also made possible by the sensor poles 210 and 230. The inductance comparator performs the measurement by applying a small oscillatory signal from the frequency generator 540 to the magnetic sensing circuit, and measuring the difference in the inductance with the rotating member in the retracted versus the extended position. The measurement frequency is chosen to maximize the distinction between the two positions. High frequency measurement minimizes the contribution of the of the major actuator poles 200 and 220, to the inductance in the sensor circuit.

Figure 6:
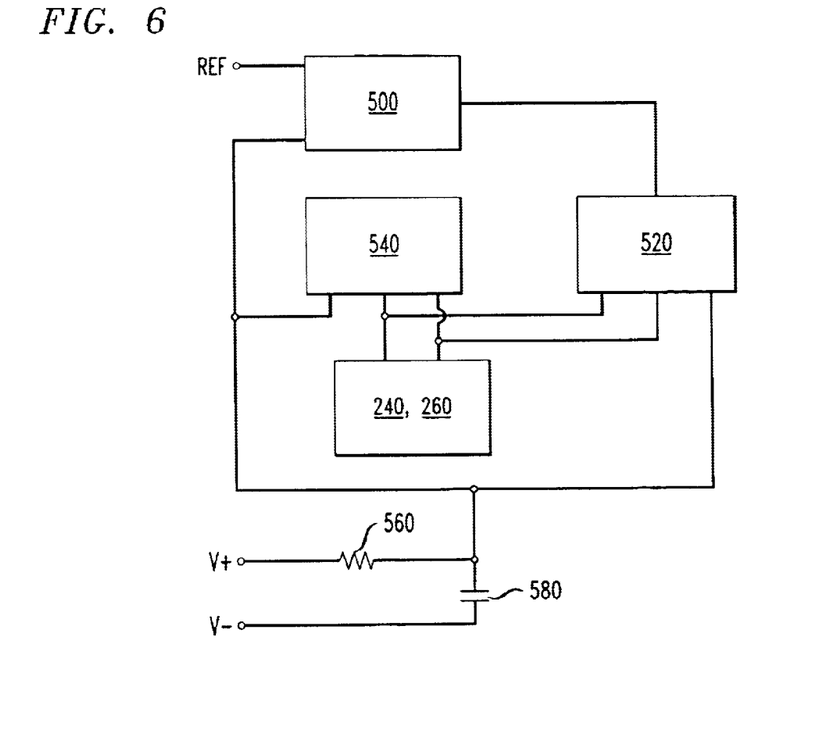
FIG. 6 is the schematic diagram of the electronic circuit used to drive the microactuator and measure its resulting position.

FIG. 6 is the schematic diagram of the electronic circuit used to drive the microactuator and measure its resulting position. Power is supplied through a resistor 560 and capacitor 580 network, to the coils of the actuator device 240 and 260, as well as to the electronic functional blocks the switch comparator 500, inductance comparator 520 and frequency generator 540. Also supplied to the comparator is a reference signal, representing the desired state of the rotating member (retracted or extended). Comparison of the actual inductance of the magnetic sensing circuit, relative to this reference, unambiguously reveals the state of the device as being in the retracted or extended position. These units support the sensing function described above.

The inductance comparator 520 monitors the inductance in the magnetic sensing circuit. The disposition of the comparator and supporting circuitry is shown in FIG. 6. A large inductance value is measured when the rotating member 60 and magnetic tab 160 are in the retracted position as shown in FIG. 1a. However when the rotating member is in the extended position shown in FIG. 1b, the magnetic tab is absent from the gap, creating a larger magnetic reluctance in the magnetic circuit, and a correspondingly low inductance as measured by the inductance comparator 520.

Figure 7A:
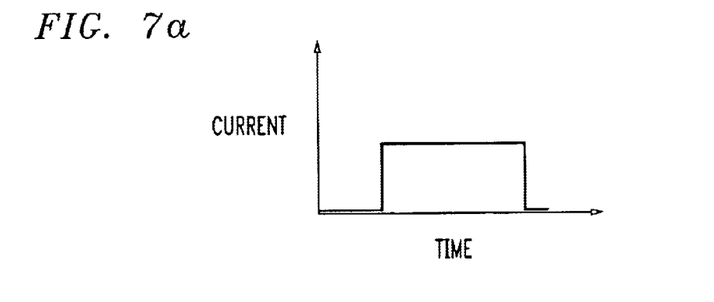
FIG. 7a is a qualitative plot of current versus time, as the device is actuated from the retracted to the extended position.

FIG. 7a is a qualitative plot of current versus time, as the device is actuated from the retracted to the extended position. The step function shown is the energizing of the coils 240 and 260 with a steady current for the duration of the step function show. The current causes magnetic flux to flow through the actuator poles 200 and 220 and across the gap. In the region of the gap, the lines of flux interact with the magnetic tab 160 affixed to the rotating member. This interaction causes a positive torque to be produced on the member about the hinge 40 and pivot point 20, and impels rotation of the member toward the extended state.

Figure 7B:
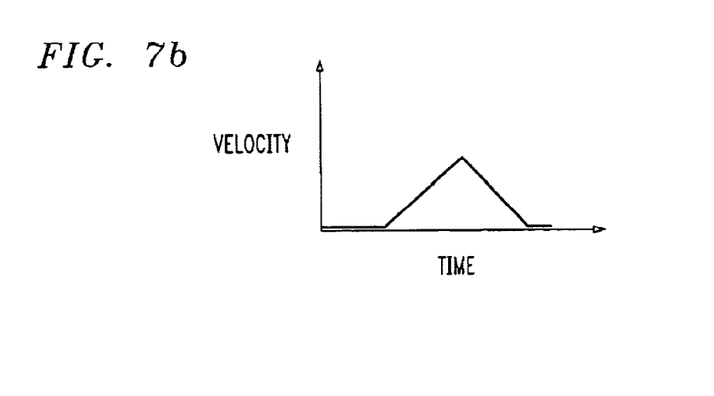

The movement is shown in the velocity profile of FIG. 7b, corresponding to the current step function in FIG. 7a. Positive acceleration of the member is established at the application of the current. The velocity reaches a peak however, as the magnetic tab 160 is centered between actuator poles 200 and 220. As the rotational deflection increases, the velocity is reduced by the magnetic force which now acts as a brake, pulling the magnetic tab 160 toward actuator poles 200 and 220. The velocity slows and the member 60 comes to a stop at the second stable minimum of the spring 100. The device remains in this position until a current is applied to the coils to retract the rotating member 60 by causing a reverse magnetic force to cause a negative torque on the rotating member and draw it back to the retracted position, where it is again stably held by the spring 100.

As can be seen from FIGS. 7a and 7b, little vibration occurs in this system because of the low mass of the pivoting member, and the relatively high viscosity of the surrounding air. The system is highly damped, and in the preferred embodiment, no servo control of the motion is required. However it will be clear to one skilled in the art, that for higher mass or less damped systems, the sensor signal may be used to position the member under closed servo loop control, by the inclusion of appropriate logic. The sensor signal is compared to a reference, and the voltage across the driving coils is adjusted until the error signal reaches a predetermined value. Standard proportional-integral-derivative (P-I-D) logic may be applied. Alternatively, the characteristic vibration can be "learned", and a driving voltage profile can be calculated which minimizes vibration and settling time. A third alternative exists wherein the voltage induced in the coils by the motion of the magnetic tab through the gap field can be detected, and closed loop control applied. This avoids the need for an auxiliary magnetic sensing structure.

Another alternative embodiment of the sensing magnetic circuit includes a center tap lead from coil 240 can be brought to a third bonding pad. Use of a center tap improves the signal-to-noise of the measurement by canceling DC contributions to the inductance measurement. Use of a center tap lead to improve inductance measurements is well known in magnetic recording data heads.

The invention described here therefore serves a critical and long felt need to provide a high precision, high bandwidth, large throw, latching microactuator. It further accomplishes these functions    a. with a device using a simple, integral hinge structure to allow rotational motion, rather than a more complex bearing;

b. with a device that can stably remain in either of two positions, determined by a latching spring;

c. with a device actuated by a simple electromagnetic coil and core combination, well known in the MEMS and data storage industry;

d. with a device capable of a large (approximately 30 degree) range of motion;

e. with a device whose status, retracted or extended, can be determined by an on-board sensing apparatus.

f. in a small, rugged, micromachined package;

g. with a device capable of braking (decelerating) the high-speed actuator using the incorporated motor.

h. with a device capable of closed-loop servo control of the speed or position of the driven member.

A further object of the invention is to achieve the low inertia latching microactuator using known lithographic batch processing methods, with known microcomponents and subassemblies.

Still a further object is to embody the invention in a device sufficiently simple, that it can be practiced in different thin-film fabrication facilities, which use slightly different tools and procedures, to produce the reproducible, uniform and predictable product, without undue experimentation or adaptation of the equipment.

It will be understood by those of ordinary skill in the art, that these embodiments are given by example, and are primarily illustrative of the many possible configurations of the present invention, which are possible. For example any number of utilitarian features can be actuated using this device, for example fluid flow ailerons, valves and switches. Design tools such as finite element analysis will render many variations for the radially compressive spring and pivot. Springs which naturally have a plurality stable states, such as an "s" spring with an inflection point, may be employed without departing from the spirit and scope of this invention. Therefore, it is to be understood that the particular embodiments shown and described by way of illustration are in no way intended to be considered limiting. The present invention is limited only by the following claims:

We claim:

1. A Micromechanical actuator, comprising:
   a nonmagnetic substrate having a top surface;
   a fixed magnetic core formed on the substrate, the magnetic core having end faces spaced apart to define a gap in the core;
   a pivotably mounted driven member free to move through an arc of less than 360 degrees and attached to a stationary pivot point;
   a magnetic tab affixed to one end of the pivotably mounted driven member, said tab comprising magnetic material and so disposed as to protrude into the gap over a portion of its allowed arc of rotation;
   a hinge for supporting the pivotably mounted driven member above the substrate, said hinge allowing the angular movement of the member, and allowing the magnetic tab of the member to move through a vicinity of the gap; and
   a coil of electrical conductor coupled to the fixed magnetic core to provide magnetic flux therethrough when the coil is supplied with electrical current, such that a magnetic field arises in the gap formed in the core which can impart motion to the pivotably mounted driven member by interaction of the gap field with the magnetic protruding tab on said member.

2. The actuator of claim 1 wherein the magnetic core and magnetic protruding tab are substantially in the same plane as the pivotably mounted member.

3. The actuator of claim 1 wherein the magnetic core and the magnetic tab are made of ferromagnetic material.

4. The actuator of claim 1 wherein the magnetic core and the magnetic protruding tab are made of nickel-iron permalloy.

5. The actuator of claim 1 wherein the magnetic protruding tab is made of permanently magnetized material.

6. The actuator of claim 1 in which the magnetic protruding tab is offset from the center of the gap.

7. The actuator of claim 1 wherein the hinge for supporting the pivotably mounted driven member comprises a narrow isthmus of material connecting the member to the stationary pivot point, said isthmus being of appropriate dimension to allowed the desired range of elastic bending angularly about the pivot point.

8. The actuator of claim 7 wherein the pivotably mounted driven member has a plurality of stable orientations.

9. The actuator of claim 8 wherein the range of angular movement of the pivotably mounted driven member is constrained by an s-spring having a mechanical inflection point.

10. The actuator of claim 8 wherein the range of angular movement of the pivotably mounted driven member is constrained by a radial spring affixed to the member, and attached to the substrate at an anchor point, said anchor point being laterally separated from the stationary pivot point.

11. The actuator of claim 10, further comprising a serpentine portion in the radially compliant spring to increase angular compliance about said anchor point.

12. The actuator of claim 10 wherein the spring is affixed to the substrate via an integrally formed, angularly compliant pivot bearing.

13. The actuator of claim 12 wherein the pivot bearing is of clam-shell design.

14. The actuator of claim 12 wherein, the pivot bearing is of accordion design.

15. The actuator of claim 12 wherein a utilitarian feature is affixed to the pivotably mounted driven member.

16. The actuator of claim 15 wherein the utilitarian feature is an electrical relay.

17. The actuator of claim 15 wherein the utilitarian feature is a fluid flow diverter.

18. The actuator of claim 15, further comprising a secondary magnetic sensing circuit, sensitive to a position of the pivotably mounted driven member.

19. The actuator of claim 18, which further comprises a narrowed region in the secondary magnetic sensing circuit which limits the amount of flux carried in the secondary magnetic sensing circuit.

20. The actuator of claim 18 further comprising an inductance comparator which can measure a position of the magnetic tab relative to the core gap.

21. The actuator of claim 18, further comprising logic circuitry for applying a braking force to the driven member, based on a position measurement of the sensing circuit.

22. The actuator of claim 18, which further comprises logic circuitry for providing closed loop feedback control of a position of the driven member.

23. The actuator of claim 18, which further comprises logic circuitry for providing closed loop feedback control of a velocity of the driven member.

24. The actuator of claim 18, further comprising logic circuitry for driving the member in a predetermined velocity profile, based on prior measurement of dynamics of the actuator.

* * * * *